(12) United States Patent
Küng et al.

(10) Patent No.: US 11,312,514 B2
(45) Date of Patent: Apr. 26, 2022

(54) METHOD AND APPARATUS FOR CARRYING OUT A FILLING PROCESS

(71) Applicant: Endress+Hauser Flowtec AG, Reinach (CH)

(72) Inventors: Thomas Küng, Münchenstein (CH); Fabio Schraner, Basel (CH); Dominik Voglgsang, Binzen (DE)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 164 days.

(21) Appl. No.: 16/757,743

(22) PCT Filed: Sep. 27, 2018

(86) PCT No.: PCT/EP2018/076283
§ 371 (c)(1),
(2) Date: Apr. 20, 2020

(87) PCT Pub. No.: WO2019/076604
PCT Pub. Date: Apr. 25, 2019

(65) Prior Publication Data
US 2021/0188465 A1    Jun. 24, 2021

(30) Foreign Application Priority Data

Oct. 20, 2017   (DE) ................. 10 2017 124 565.0

(51) Int. Cl.
*B65B 3/34*    (2006.01)
*B65B 3/30*    (2006.01)
(Continued)

(52) U.S. Cl.
CPC ............. *B65B 3/34* (2013.01); *B65B 3/30* (2013.01); *G01F 13/006* (2013.01); *G01F 15/001* (2013.01)

(58) Field of Classification Search
CPC . B65B 3/34; B65B 3/30; G01F 13/006; G01F 15/001
See application file for complete search history.

(56) References Cited

U.S. PATENT DOCUMENTS 4,206,788 A    6/1980   Susaki
4,696,329 A    9/1987   Izzi
(Continued)

FOREIGN PATENT DOCUMENTS

DE    4117287 A1    5/1991
DE    4117287 A1    12/1992
(Continued)

*Primary Examiner* — Jason K Niesz
(74) *Attorney, Agent, or Firm* — Kelly J. Smith; Endress+Hauser (USA) Holding Inc.

(57) ABSTRACT

The present disclosure recites a method for time controlled carrying out of a filling process including steps of beginning a first flow measurement before or during the start of a filling of a first container, starting the filling of the first container at a first point in time, and ending the filling of the first container at a second point in time, wherein the second point in time is predetermined by a set, first time interval. The starting and ending steps are repeated for filling a second container. The method also includes ending the first flow measurement and ascertaining a total flow of the preceding fillings, comparing an actual value ascertained from the total flow a predetermined, desired value, and-adapting the first time interval based on the comparing step. An apparatus according to the present disclosure includes a control setup for time controlled fill amount control and a flowmeter.

16 Claims, 1 Drawing Sheet

(51) Int. Cl.
 *G01F 15/00* (2006.01)
 *G01F 13/00* (2006.01)

(56) References Cited

U.S. PATENT DOCUMENTS

| | | | | |
|---|---|---|---|---|
| 5,273,082 A | * | 12/1993 | Paasche | B67C 3/10 141/147 |
| 6,148,877 A | * | 11/2000 | Bethke | B65B 3/28 141/1 |
| 8,985,161 B2 | * | 3/2015 | Lorenz | B65B 3/34 141/1 |

FOREIGN PATENT DOCUMENTS

| | | |
|---|---|---|
| DE | 69405004 T2 | 10/1994 |
| DE | 102006029490 A1 | 1/2008 |
| DE | 102008016235 A1 | 10/2009 |
| DE | 102008016296 A1 | 10/2009 |
| DE | 102009024862 A1 | 12/2010 |
| DE | 102013100702 A1 | 7/2014 |
| DE | 102015122032 A1 | 6/2017 |
| WO | 2007006436 A1 | 1/2007 |
| WO | 2007048742 A1 | 3/2007 |
| WO | 2007048742 A1 | 5/2007 |

\* cited by examiner

METHOD AND APPARATUS FOR CARRYING OUT A FILLING PROCESS

CROSS-REFERENCE TO RELATED APPLICATIONS

The present application is related to and claims the priority benefit of German Patent Application No. 10 2017 124 565.0, filed on Oct. 20, 2017, and International Patent Application No. PCT/EP2018/076283, filed on Sep. 27, 2018, the entire contents of which are incorporated herein by reference.

TECHNICAL FIELD

The present invention relates to a method and to an apparatus for carrying out a filling process.

BACKGROUND

Applicant supplies flowmeters to the bottling industry under the marks, "Dosimag" and "Dosimass". These measuring devices possess the function, "integrated batching", which has the ability to operate the fillings. Thus, the filling valves can be directly operated by the flowmeter and trickle during and after valve shut off can be automatically corrected.

The control of fillings according to the methods of the prior art can, however, be negatively influenced by different factors, especially by very short filling times and disturbances of the medium, e.g. pressure fluctuations and/or temperature fluctuations, depending on the measurement principle.

SUMMARY

Starting from the aforementioned state of the art, an object of the present invention is to provide an improved method for control of the filling process.

The present invention achieves this object by a method as defined in claim 1 and by an apparatus as defined in claim 11.

A method of the invention carrying out a filling process controlled as a function of time includes steps as follows:
Step A beginning a first flow measurement before or during the start of a filling of a first container;
Step B starting the filling of the first container at a first point in time $t_0$;
Step C ending the filling of the first container at a second point in time $t_E$, wherein the second point in time $t_E$ is predetermined by a set, first time interval;
Step D repeating steps B and C one or preferably more times for filling a second or a number of other containers;
Step E ending the first flow measurement and ascertaining a total flow of preceding fillings;
Step F comparing an actual value ascertained from the total flow with a predetermined, desired value, and
Step G adapting the first time interval based on the comparison according to Step F.

The method of the invention enables the implementing of very short filling times. In other than a pure time control, it additionally provides a compensating of other disturbing factors, for example, pressure- or temperature fluctuations.

Advantageous embodiments of the invention are contained in the dependent claims.

The method has at least five, preferably at least ten, especially preferably 10 to 100 repetitions of steps B and C for filling. In such case, at least five, preferably at least ten, especially preferably 10 to 100 containers are filled, which especially preferably have the same volume as the first container.

The filling volumes of the individual fillings of the containers, which are ascertained by the flow measurements, are added to determine the total volume.

The time interval of the filling in step C amounts preferably to at least 10 ms (milliseconds).

The time interval of the filling in step C can advantageously amount to maximum 1 s (second), preferably less than 550 ms (milliseconds), especially preferably less than 250 ms (milliseconds).

The time period for ascertaining the total flow can advantageously amount to at least 9 s (seconds), preferably 10 s to 5 min (minutes).

The filling of the containers occurs preferably without special trickle control. In conventional filling of the containers, the trickle behavior of the filling valve is often taken into consideration. This presents a special challenge in the case of flow controlled filling. In usual flow controlled filling, the direct manipulated variable is the integrated flow quantity, at which the closing of the fill valve is initiated. In the case of time controlled filling, control occurs by setting the time interval for filling.

Advantageously, steps B-G are executed in a first operating mode and a second operating mode is provided, i.e. the method has a second operating mode, in which the turn off point in time of the filling occurs based on a current volume- and/or mass flow measurement for filling a container, wherein the second operating mode is operated as main operating mode and the first operating mode is used, to the extent that the second operating mode ventures outside a tolerance range.

Such a switching of operating modes can occur, for example, in the case of a disturbance in the measurement (measurement outliers). Typically, the second operating mode corresponds to the previously usual procedure for filling and the first operating mode is used in the case of irregularities.

The comparison of step F can occur by a comparison of the measurement of an ascertained average amount of filling for an individual filling as measured value with a predetermined, desired value. The actual value can be ascertained from the total flow of a plurality of directly preceding fillings.

The comparison of step F can be performed by a moving average value filter.

Additionally, the average value filter can be supplemented by a median filter, thus, a filter for significantly differing values, so-called outliers. The median filter and/or the average value filter are preferably parameterable by user. The median filter is preferably placed in front of the average value filter.

Furthermore, according to the invention, an apparatus comprising a control setup for time controlled fill amount control and a flowmeter is provided, especially for executing the method as claimed in one of the preceding claims.

The control setup can, in such case, be integrated at least partially in the flowmeter. The apparatus includes a controller and a control system. In such case, especially at least the controller is advantageously integrated in the flowmeter.

By integrating the controller in the flowmeter, the time controlled fill amount control can be integrated with little apparatus complexity into an existing system.

The controller can have a first $PT_1$ unit for the comparison of a desired value with an actual value. The actual value can be ascertained from a total flow measured from a plurality of time controlled fill amount fillings.

The controller can have a second $PT_1$ unit for ascertaining a time required for individual filling.

Median filters can be placed in front of both of the aforementioned $PT_1$ units.

Furthermore, the control system can have a hydraulic system, especially a pump and a supply tank, and a pressure measuring apparatus, for pressure control in the supply tank.

The flowmeter can advantageously be embodied as a Coriolis flowmeter. Alternatively, also a magnetically inductive flowmeter provides an advantageous option. The Coriolis flowmeter has, however, a higher sampling rate and higher accuracy for a faster filling.

BRIEF DESCRIPTION OF THE DRAWINGS

The invention will now be explained in greater detail based on an example of an embodiment and with the aid of the appended drawing. The example of an embodiment is not intended to limit the scope of the invention. Especially, individual features of the embodiment can in the context of the present invention also be applied separately and detached from the example of an embodiment. The figures of the drawing show as follows.

DETAILED DESCRIPTION

Figure 1:
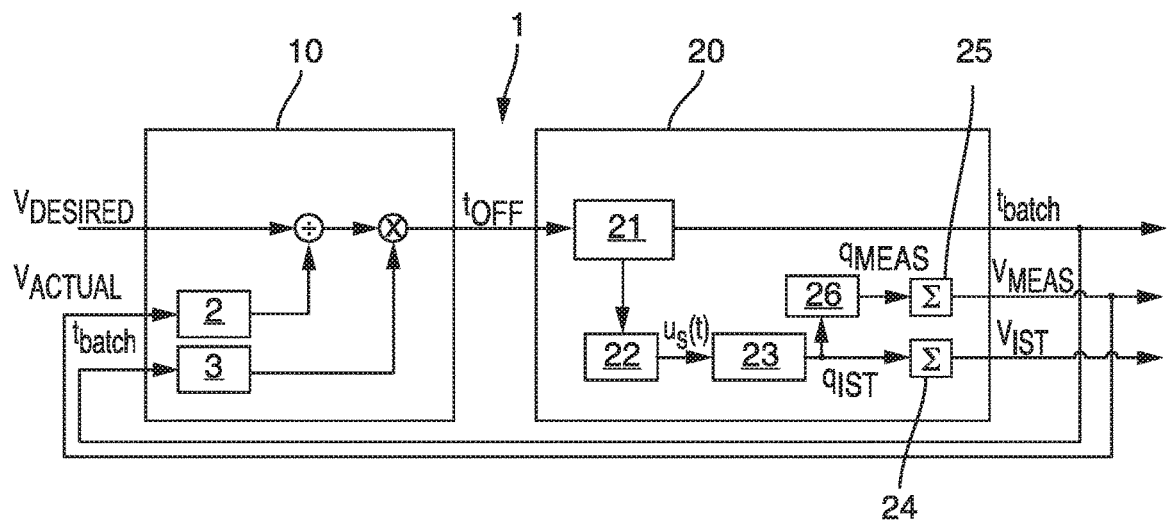
FIG. 1 shows schematic view of a control setup for a time controlled filling.

The control setup shown in FIG. 1 serves for a time controlled filling with fill amount control using flowmeters Such a time controlled filling can be applied in the case of difficult filling applications, for example, in the case of filling small amounts in correspondingly very short filling times, when conventional measuring principles reach their limits. Other difficult filling applications involve, for instance, flow measurement signals, which are disturbed due to process conditions (e.g. by solids, small gas bubbles).

In the case of the present invention, a better result is achieved by a time control of the filling.

Time controlled filling is further developed in the present method by a control of the measured amount of filling.

At point in time, zero, the filling valve is opened and a timer started. After a certain time passes, the filling valve is closed.

During the filling, a flow measurement occurs. For controlling the amount of filling, the method uses the amount and time averaged over a certain number of past fillings, for example, the averaged amount and time of 10 fillings.

This enables compensating e.g. slow fluctuations of the average value of the amount of filling per individual filling time interval e.g. due to slower changes of temperature or pressure. Because of the control of the invention, control of trickle can be omitted, since this is already taken into consideration in the average value of the amount of filling.

A preferred control setup for the time controlled filling is shown in FIG. 1. The control setup 1 includes a controller 10 and a control system 20.

The input value $V_{DESIRED}$ of the control setup is a predetermined amount of filling, thus, a mass or a volume.

A first LTI transfer member embodied as $PT_1$ unit 2 enables the taking into consideration by the controller 10 of an amount of filling $V_{MEAS}$ ascertained by the flowmeter as a mass- or volume value.

A second LTI transfer member embodied as $PT_1$ unit 3 enables taking into consideration by the controller 10 of the time required for a filling.

Controller 10 ascertains as output value the time $t_{OFF}$ required for filling. Controller 10 transfers the output value $t_{OFF}$ to the control system 20 as a time predetermined for filling. Control system 20 performs a filling time ascertainment taking into consideration the output value and, in given cases, one or more further disturbance variables DV. The disturbance variables can be input into the control system by measuring, calculation or manual input of user.

A switch 22 outputs a time-dependent voltage equivalent signal $u_S(t)$ to a hydraulic system 23.

The hydraulic system 23 forwards an effective flow $q_{ACTUAL}$ to a measuring system 26, which ascertains a measured flow $q_{MEAS}$ as a mass- or volume flow.

From the effective flow, a computing unit 24 yields an effective amount of filling $V_{ACTUAL}$.

From the measured flow, a measured amount of filling $V_{MEAS}$ can be ascertained by a computing unit 25, and the predetermined time $t_{OFF}$ leads to a new time $t_{batch}$ required for filling.

In order to gauge the effectiveness of the method, different filling experiments were performed with a Dosimass DN8 (⅜") of the firm, Endress and Hauser, using the aforementioned control setup 1 in a calibration plant.

Also, two other variants of filling were compared:
a) a conventional filling with flow measurement and trickle correction.
b) a filling with a fixedly set time.
c) a time controlled filling with filling amount correction such as illustrated by the control setup of FIG. 1.

In order to bring about instances, in the case of which the conventional flow measurement reaches its limits, the deflection amplitude of the Coriolis oscillation of the Dosimass was lessened, in order to increase the intrinsic noise.

This intrinsic noise simulates the noise, which limits the reproducibility of the amount of filling in the case of small filling amounts.

Figure 2:
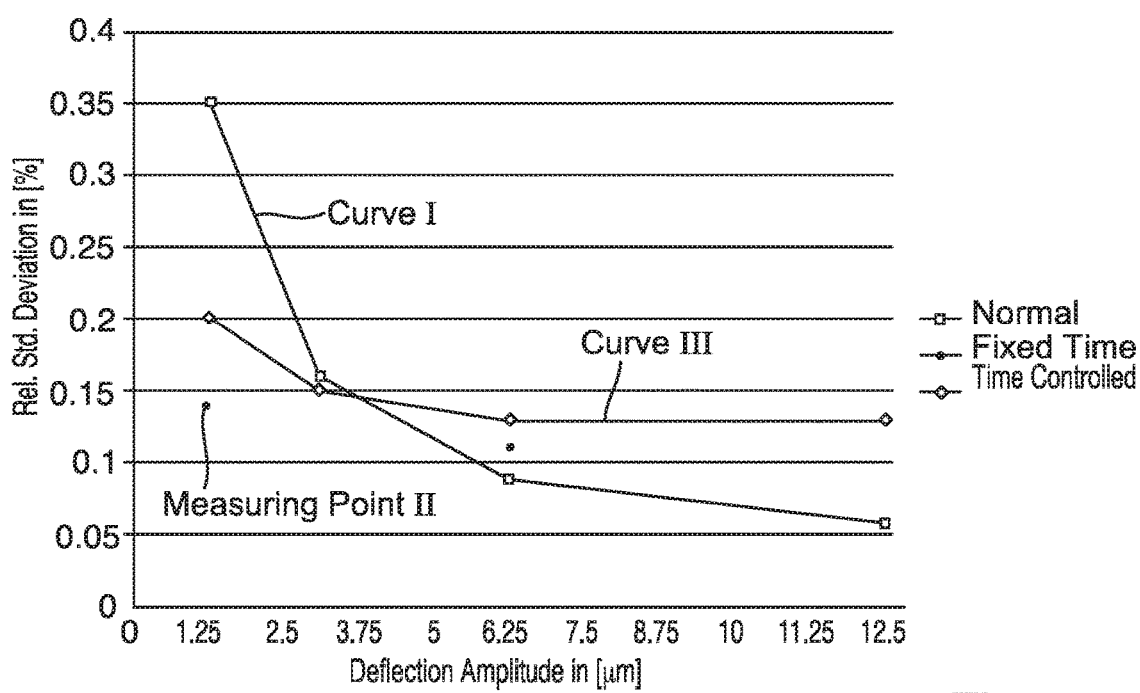
FIG. 2 shows standard deviation for filling experiments.

Shown in FIG. 2 are the results of the filling experiments.

In the filling experiments, 1000 fillings per filling series were performed. The desired amount was 150 gram in such case. The flow rate was 100 gram per second. The system pressure of the filling plant was 0.7 bar and the deflection amplitude of the oscillation was between 1.25 and 12.5 μm.

Shown on the Y axis is the relative standard deviation of the fillings of a filling series and on the X axis the deflection amplitude of the Coriolis oscillation of the Coriolis flowmeter. It can be seen that in the case of the conventional measuring a) (Curve I) the standard deviation increases with the relative intrinsic noise of the wanted signal amplitude (depending on the oscillation amplitude) of the measuring device.

In the case of the time controlled filling c) with fill amount control (Curve III), likewise a dependence on the intrinsic noise is present. This stems from the fact that the measured filling amounts are used to calculate the new filling time.

The filling b) with fixed time (measurement points II) in the experiment with 1.5 seconds has in these experiments better results than the time controlled filling with fill amount control (Curve III).

In the case of slow changes of pressure conditions or viscosity—e.g. due to fluctuations in the formulation of the product or the temperature during a day or over a year, it has been found that the filling with fixed time functions, however, increasingly less accurately than the time controlled filling with fill amount control (Curve III).

For the time controlled filling with fill amount control (Curve III), when considering a relatively short period of time with stable process conditions, by averaging over a larger number of filling amounts, the standard deviation of the time controlled filling nears that of the fixed filling time.

The time controlled filling with fill amount control provides, consequently, an especially reliable means of filling, especially in the case of reproducible processes.

In the case with the highest relative intrinsic noise (Coriolis oscillation amplitude at 1.25 μm), the time control (Curve III) provided an improvement by a factor 2, compared with the conventional filling variant (Curve I).

The invention claimed is:

1. A method for time controlled carrying out of a filling process, the method including steps of:
   beginning a first flow measurement before or during the start of a filling of a first container;
   starting the filling of the first container at a first point in time;
   ending the filling of the first container at a second point in time, wherein the second point in time is predetermined by a set, first time interval;
   repeating the starting step and the first ending step one or more times for filling a second or a number of other containers;
   ending the first flow measurement and ascertaining a total flow of preceding fillings;
   comparing an actual value ascertained from the total flow with a predetermined, desired value, and adapting the first time interval based on the comparison step.

2. The method of claim 1, wherein at least five repetitions of the starting step and the first ending step for filling at least five containers occur in the repeating step.

3. The method of claim 1, wherein the time interval of the starting step is at least 10 milliseconds.

4. The method of claim 1, wherein the time interval of the starting step is less than 550 milliseconds.

5. The method of claim 1, wherein the time period for ascertaining the total flow is at least 9 seconds.

6. The method of claim 1, wherein the filling occurs without trickle control.

7. The method of claim 1, wherein the comparing step includes comparing a measurement of the measurement of an average amount of filling for an individual filing as a measured value, as determined using the total flow of a plurality of directly preceding fillings, with the predetermined desired value.

8. The method of claim 1, wherein the starting step through the adapting step are executed in a first operating mode and a second operating mode is provided in which the turn off point in time of the filling occurs based on a current volume or mas flow measurement for filling a container; and wherein the second operating mode is operated as the main operating mode and the first operating mode is used when the second operating mode is outside a tolerance range.

9. The method of claim 1, further including performing the comparing step by a moving average value filter.

10. The method of claim 9, where a median filter is placed in front of the average value filter.

11. An apparatus for carrying out a filling process, the apparatus configured to:
   begin a first flow measurement before or during the start of a filling of a first container;
   start the filling of the first container at a first point in time;
   end the filling of the first container at a second point in time, wherein the second point in time is predetermined by a set, first time interval;
   repeat the starting step and the first ending step one or more times for filling a second or a number of other containers;
   end the first flow measurement and ascertaining a total flow of preceding fillings;
   compare an actual value ascertained from the total flow with a predetermined desired value; and
   adapt the first time interval based on the compare step, Apparatus for carrying out a filling process, comprising a control setup (1) for time controlled fill amount control and a flowmeter, especially for executing the method as claimed in one of the preceding claims, wherein the control setup (1) includes at least one controller (10) and a control system (20) and wherein at least the controller (10) is integrated in the flowmeter.

12. The apparatus of claim 11, wherein the control system has a hydraulic system including a pump, a supply tank, and a pressure measuring apparatus for pressure control in the supply tank.

13. The apparatus of claim 11, wherein the flow meter is embodied as a Coriolis flow meter or a magnetically inductive flow meter.

14. The apparatus of claim 11, wherein the apparatus has at least one filling valve.

15. The apparatus of claim 11, wherein the controller has a first unit for comparing a desired value with an actual value which is ascertained from a total flow measured from a plurality of time controlled fill amount fillings.

16. The apparatus of claim 15, wherein the controller has a second unit for ascertaining a time requested for individual filling.

* * * * *